United States Patent
Jiang

(10) Patent No.: US 8,452,279 B2
(45) Date of Patent: May 28, 2013

(54) TRAFFIC REDIRECTION ON DATA ROAMING TRAFFIC

(75) Inventor: John Yue Jun Jiang, Danville, CA (US)

(73) Assignee: Roamware, Inc., Danville, CA (US)

( * ) Notice: Subject to any disclaimer, the term of this patent is extended or adjusted under 35 U.S.C. 154(b) by 210 days.

(21) Appl. No.: 13/018,118

(22) Filed: Jan. 31, 2011

(65) Prior Publication Data

US 2011/0281582 A1    Nov. 17, 2011

Related U.S. Application Data

(60) Provisional application No. 61/299,677, filed on Jan. 29, 2010.

(51) Int. Cl.
*H04W 4/00* (2009.01)

(52) U.S. Cl.
USPC ............... 455/433; 455/432.1; 455/456.1

(58) Field of Classification Search ....... 455/432.1–433, 455/456.1–457
See application file for complete search history.

(56) References Cited

U.S. PATENT DOCUMENTS

| | | | | |
|---|---|---|---|---|
| 7,072,651 B2* | 7/2006 | Jiang et al. | ............. | 455/432.1 |
| 7,466,652 B2* | 12/2008 | Lau et al. | ............. | 370/230.1 |
| 2002/0094811 A1* | 7/2002 | Bright et al. | ............. | 455/433 |
| 2006/0246897 A1* | 11/2006 | Jiang | ............. | 455/435.1 |
| 2008/0207181 A1* | 8/2008 | Jiang | ............. | 455/414.1 |
| 2009/0276386 A1* | 11/2009 | Greening et al. | ............. | 706/47 |
| 2010/0118790 A1* | 5/2010 | Guo et al. | ............. | 370/328 |

* cited by examiner

*Primary Examiner* — Allahyar Kasraian
(74) *Attorney, Agent, or Firm* — Arent Fox LLP

(57) ABSTRACT

The present invention is directed towards a method for directing roaming traffic associated with a subscriber of an HPMN. The method includes detecting a location update message from the subscriber at a non-preferred VPMN. The subscriber has an established data context with the non-preferred VPMN. The method further includes sending one or more location update messages to one or more elements associated with the non-preferred VPMN, thus causing the subscriber to associate with a preferred VPMN.

17 Claims, 6 Drawing Sheets

TRAFFIC REDIRECTION ON DATA ROAMING TRAFFIC

RELATED APPLICATIONS

This application claims the benefit of U.S. Provisional Application No. 61/299,677 titled "Traffic Redirection on Data Roaming Traffic" filed on Jan. 29, 2010. This application is also related to U.S. patent application Ser. No. 10/635,804 titled "Method and System for Cellular Network Traffic Redirection" filed on Aug. 5, 2003, now U.S. Pat. No. 7,072,651. The entirety of each of the preceding patent applications is incorporated by reference herein.

FIELD OF THE INVENTION

The present invention generally relates to roaming. More specifically, the invention relates to method and system for steering of roaming devices with data roaming support.

BACKGROUND OF THE INVENTION

Roaming traffic contributes a significant percentage of an operator's revenue and even a better percentage of the operator's margin. With increasing competition and regulatory control, operators are being more pressured to increase their roaming revenue and reduce roaming margin losses. Over the last few years, revenues to the network operators from home subscribers have consistently declined due to increased competition and resulting pricing pressures. On the other hand, revenues from roamers have consistently grown in the same period due to increased mobile penetration in local markets and an increase in travel. Various network operators have preferred bilateral roaming agreements ("partnerships") with each other that include more favorable roaming charges than non-partnership operators. Therefore, "preferred" visited networks are those that the home network prefers its outbound roamers to register with when traveling outside their home coverage area. Non-partner networks are "non-preferred".

Network operators can maximize their margins and the roamers can get more attractive roaming rates and services if roamers roam on their home mobile operator's preferred (or partner) networks. When the subscribers roam into visited networks from a HPMN, they may roam onto one, two or more VPMNs, one at a time, based on various criteria. These VPMNs may also include the "non-preferred" VPMN networks. Hence, protecting the existing roaming revenues and growing them further has become an important priority for the network operators worldwide. However, current methods of controlling which network a subscriber registers to when he/she is roaming have certain disadvantages.

The HPMN operators use traffic redirections techniques in their networks in order to discourage their subscribers' handsets to roam with the "non-preferred" VPMN networks. Sometimes, the HPMN operator can use traffic redirection techniques to control the distribution of outbound roamers among VPMN networks in a country so that the "preferred" VPMN network will get a very high percentage of the HPMN's roaming traffic and the "non-preferred" VPMN networks will get a low percentage of that roaming traffic. The general traffic redirection techniques are based on location update rejection error, timeout or abort techniques. The generation of these errors compels the mobile handset to initiate again a number of registration attempts.

The traffic redirection techniques can be applied to both GSM location updates as well as GPRS location updates. However, there are certain disadvantages in regular traffic redirection techniques. The problem is that when a roaming subscriber's mobile device is attached on GSM network, any attempt to steer the subscriber's GPRS location update will not be effective. Similarly, when the mobile device is attached on a GPRS data session, then traffic redirection attempt to steer the subscriber's GSM location update will not be effective. This is due to the reason that unlike GSM location update, GPRS location update can be sent during GPRS data session, hence, any steering attempt on GPRS location update is not effective, when the mobile device is already in a GPRS data session.

Moreover, there are also issues when the mobile device is already having a GPRS session with a non-preferred VPMN network, it can stay attached for a long time and HPMN traffic redirection attempts on subsequent GSM location updates from the mobile device will not be effective. This problem is further accentuated with the increasing usage of mobile devices like Blackberry, iPhone etc., which have the capability to keep their GPRS sessions alive by default. In such cases traffic steering when GPRS session is alive is not possible.

In accordance with the foregoing, there is a need in the art of a system, a method, for creating a solution that gives an operator the ways to deal with above mentioned problems and be able to steer the roaming and data traffic to a network of their choice.

SUMMARY

The present invention is directed towards a method for directing roaming traffic associated with a subscriber of an HPMN. The method further includes detecting a location update message from the subscriber at a non-preferred VPMN, when the subscriber has an established data context with the non-preferred VPMN. The method further includes sending one or more location update messages towards one or more elements associated with the non-preferred VPMN, thus making the subscriber to get associated with a preferred VPMN.

The present invention is directed towards a system for directing roaming traffic associated with a subscriber of an HPMN. The system includes a detection module for detecting a location update message from the subscriber at a non-preferred VPMN, when the subscriber has an established data context with the non-preferred VPMN. The system further includes a redirection module for sending one or more location update messages towards one or more elements associated with the non-preferred VPMN, thus making the subscriber to get associated with a preferred VPMN.

BRIEF DESCRIPTION OF DRAWINGS

In the drawings, the same or similar reference numbers identify similar elements or acts.

DETAILED DESCRIPTION

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system, a method, and a computer program product for directing roaming traffic associated with a subscriber of a Home Public Mobile Network (HPMN) from a non-preferred Visited Public Mobile Network (VPMN) to a preferred VPMN. In accordance with various embodiments, the present invention provides a method and system for redirecting data traffic (i.e. GPRS traffic) of the subscriber from the non-preferred VPMN to the preferred VPMN.

A roaming partner network corresponds to a network that has at least one roaming agreement such as, but not limited to, Global System for Mobile communication (GSM), General Packet Radio Services (GPRS), Customized Application for Mobile Enhanced Logic (CAMEL) and Third Generation of mobile (3G) agreement with the HPMN. Such a roaming partner network is hereinafter, interchangeably, referred to as preferred VPMN. On the other hand, the roaming partner network that does not have any such roaming agreement with the HPMN is hereinafter, interchangeably, referred to as the non-preferred VPMN. It will be apparent to a person skilled in the art that roaming services include standard call and non-call related activities such as, but not limited to, Mobile Originated (MO) call, Mobile Terminated (MT) call, Short Message Service (SMS), Packet Data Network (PDN), and other Value Added Services (VASs) such as call forwarding, call barring etc.

Figure 1:
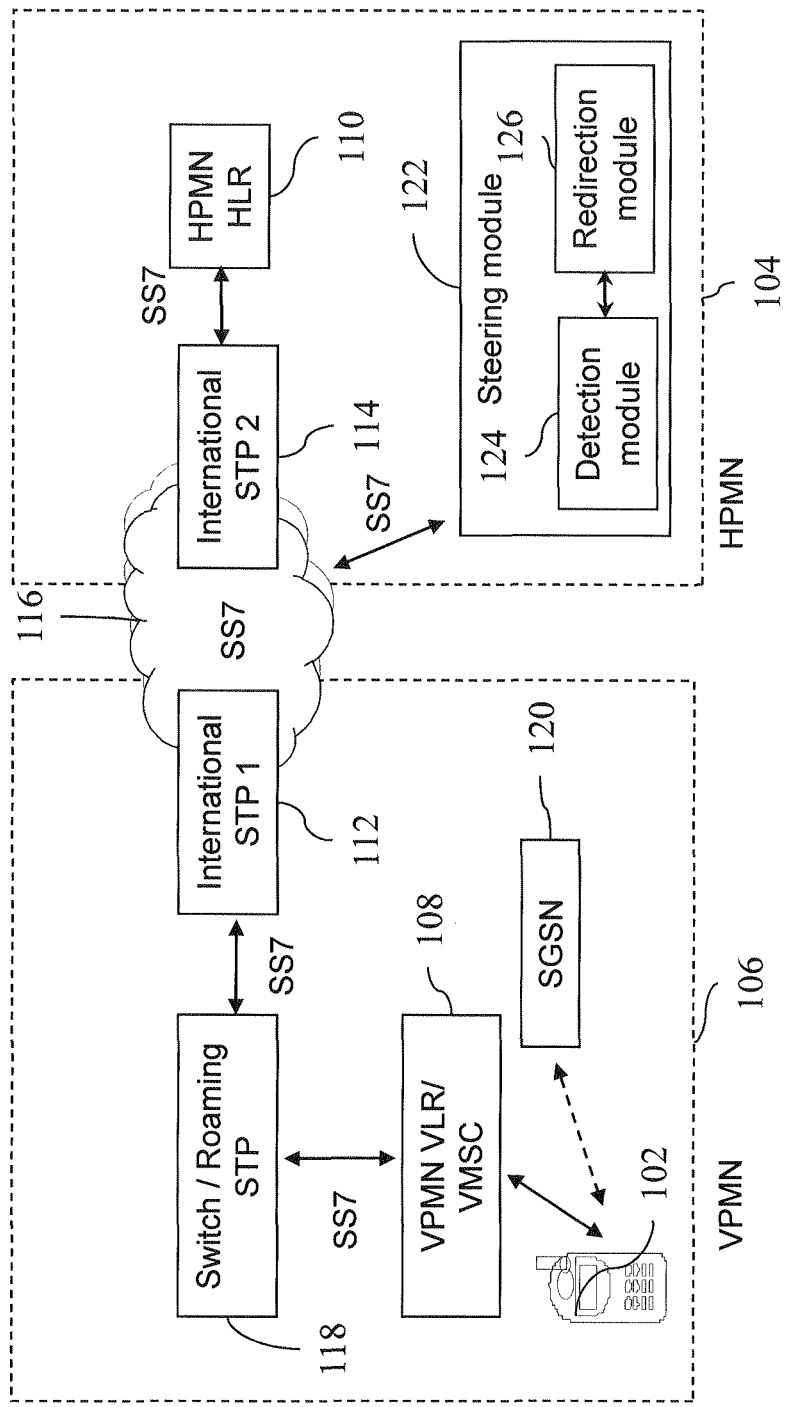
FIG. 1 illustrates a system for directing roaming traffic associated with a subscriber of a Home Public Mobile Network (HPMN), in accordance with an embodiment of the present invention.

FIG. 1 represents a system 100 for directing roaming traffic associated with a subscriber 102 of a Home Public Mobile Network (HPMN) 104, in accordance with an embodiment of the invention. Subscriber 102 using a mobile handset roams outside HPMN 104 at a Visiting Public Mobile Network (VPMN) 106. In accordance with various embodiments of the present invention, VPMN 106 is a non-preferred VPMN. The subscriber 102 is connected to a VPMN VLR 108, when it is roaming outside HPMN 102. In one embodiment of the invention, VPMN VLR 108 is integrated with a VMSC in VPMN 106. Notwithstanding, both VPMN VLR and VMSC may have different logical addresses. Subscriber profile data corresponding to subscriber 102 is stored in HPMN HLR 110. The signaling corresponding to subscriber 102 is routed using an international STP 1 112 at VPMN 106 and international STP 2 114 at HPMN 104. The signaling between HPMN 104 and VPMN 106 is carried using SS7 signaling architecture 116. The signals exchanged between HPMN 104 and VPMN 106 are MAP based signals. VPMN VLR 108 interacts with international STP 1 112 via a switch 118. In one embodiment of the invention, switch 118 is a roaming STP in VPMN 106.

In another embodiment of the present invention, subscriber 102 maintains a GPRS data session/context while roaming in VPMN 106 (i.e. non-preferred VPMN) through a connection to a Serving GPRS Support Node (SGSN) 120 in VPMN 106. These network elements communicate with each other over a Signaling System 7 (SS7) link, except that SGSN 120 communicates via an Internet Protocol (IP) link.

Other network elements of HPMN 104 (e.g., MSC/VLR) communicate with various other network elements of VPMN 106 (e.g., HLR, VLR etc.) via the SS7 link. It will also be apparent to a person skilled in the art that various components of HPMN 104 communicate with VPMN 106 using various signaling techniques including, but not limited to, SS7, SIP, IP, ISUP etc.

The existing traffic redirection mechanisms work on the principle of GSM location update rejection until a preferred VPMN operator is selected by the subscriber. However, now-a-days, there are also GPRS roaming agreements between HPMN and VPMN operators. Hence, the subscriber mobile station continues to maintain a GPRS data session with a non-preferred VPMN, even when the GSM location update with that same non-preferred VPMN is rejected by the traffic redirection mechanism. In other words, the GPRS data session remains established despite the GSM connection with that non-preferred VPMN is disconnected. Hence, specific steering of this data session from the non-preferred VPMN to the preferred VPMN is required, in order to complete the traffic redirection.

Hence, system 100 uses a steering module 122 to redirect the data traffic of subscriber 102 to some other preferred VPMN. Steering module 122 includes a detection module 124 that detects the location update messages between subscriber 102 and non-preferred VPMN 106. Steering module 122 further includes a redirection module 126 that sends one or more location update messages to various network elements within VPMN 106, to steer away subscriber 102 from VPMN 106 to some preferred VPMN (not shown in FIG. 1). It will be apparent to a person skilled in the art that method steps or activities performed by detection module 124 and redirection module 126 are distinguished only for the sake of representation. However, since both these sub-modules (i.e., detection module 124 and redirection module 126) are part of steering module 122, any action step or procedure performed by these two sub-modules is equivalent to it being performed by steering module 122 itself, as one unit.

In one embodiment of the invention, steering module 122 is deployed by HPMN operator 104. In one embodiment of the invention, steering module 122 passively monitors all the signals exchanged between international STP 1 112 in VPMN 106 and international STP 2 114 in HPMN 104, by tracking the SS7 signaling messages. In another embodiment of the present invention, steering module 122 actively monitors all signals exchanged between subscriber 102, VPMN 106 and HPMN 104.

It will also be apparent to a person skilled in the art that HPMN 104 and VPMN 106 may also include various other network components (not shown in FIG. 1), depending on the architecture under consideration. In an embodiment of the present invention, various network elements of HPMN 104 and VPMN 106 are located in an IR.21 database (not shown in FIG. 1) such as RAEX IR.21. In an embodiment of the present invention, the IR.21 database is coupled to steering module 120.

Figure 2:
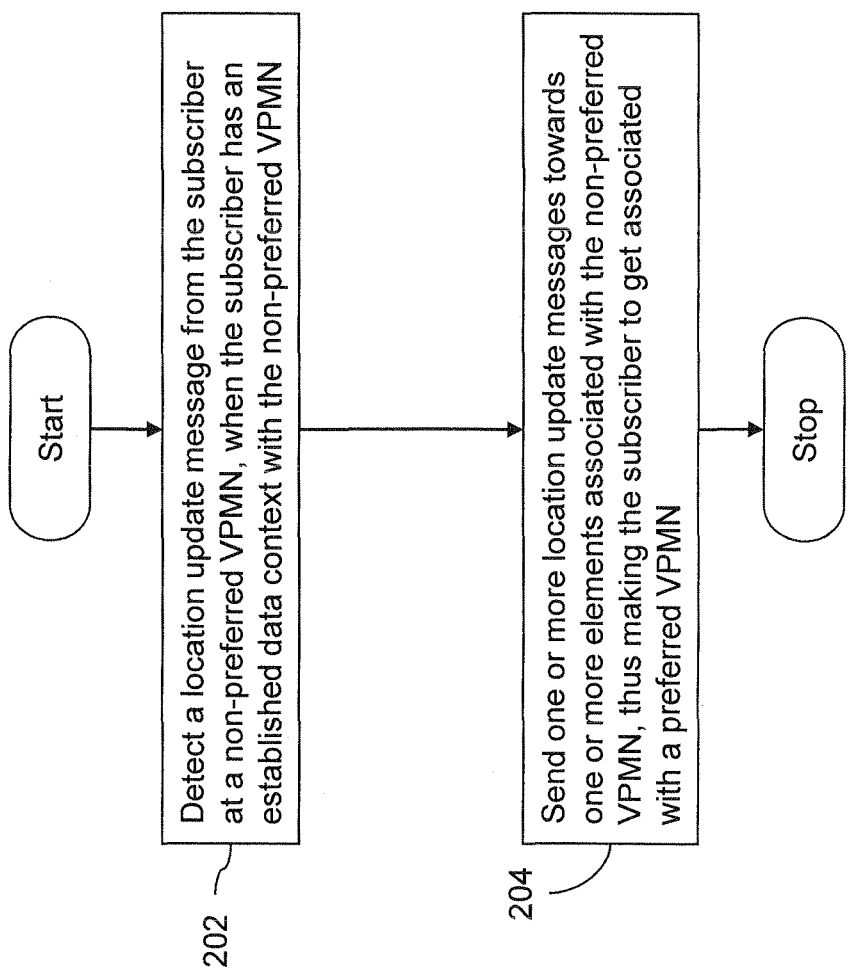
FIG. 2 represents a flowchart for directing roaming traffic associated with a subscriber of the HPMN, in accordance with an embodiment of the present invention.

FIG. 2 represents a flowchart for directing roaming traffic associated with subscriber 102 of HPMN 104, in accordance with an embodiment of the present invention. At step 202, detection module 124 detects a location update message from subscriber 102 at VPMN 106 (i.e. non-preferred VPMN), when subscriber 102 has an established data session/context with VPMN 106. Thereafter, at step 204, redirection module 126 sends one or more location update messages to one or more elements of VPMN 106, thus forcing subscriber 102 to get associated with a preferred VPMN. In accordance with an embodiment of the present invention, redirection module 126 sends a Cancel Location message with "subscription withdrawn" attribute to SGSN 120 of VPMN 106, which causes the mobile handset to terminate the GPRS data session with VPMN 106. Thereafter, redirection module 126 sends multiple GSM location update reject messages (i.e. regular traffic redirection technique) to force subscriber 102 to select an alternative VPMN network that would be a preferred VPMN for HPMN 104. Thus, subscriber 102's GPRS session ends before regular traffic redirection technique is applied. This ensures complete steering of roaming subscriber (both voice and data) from a non-preferred VPMN to a preferred VPMN.

Figure 3:
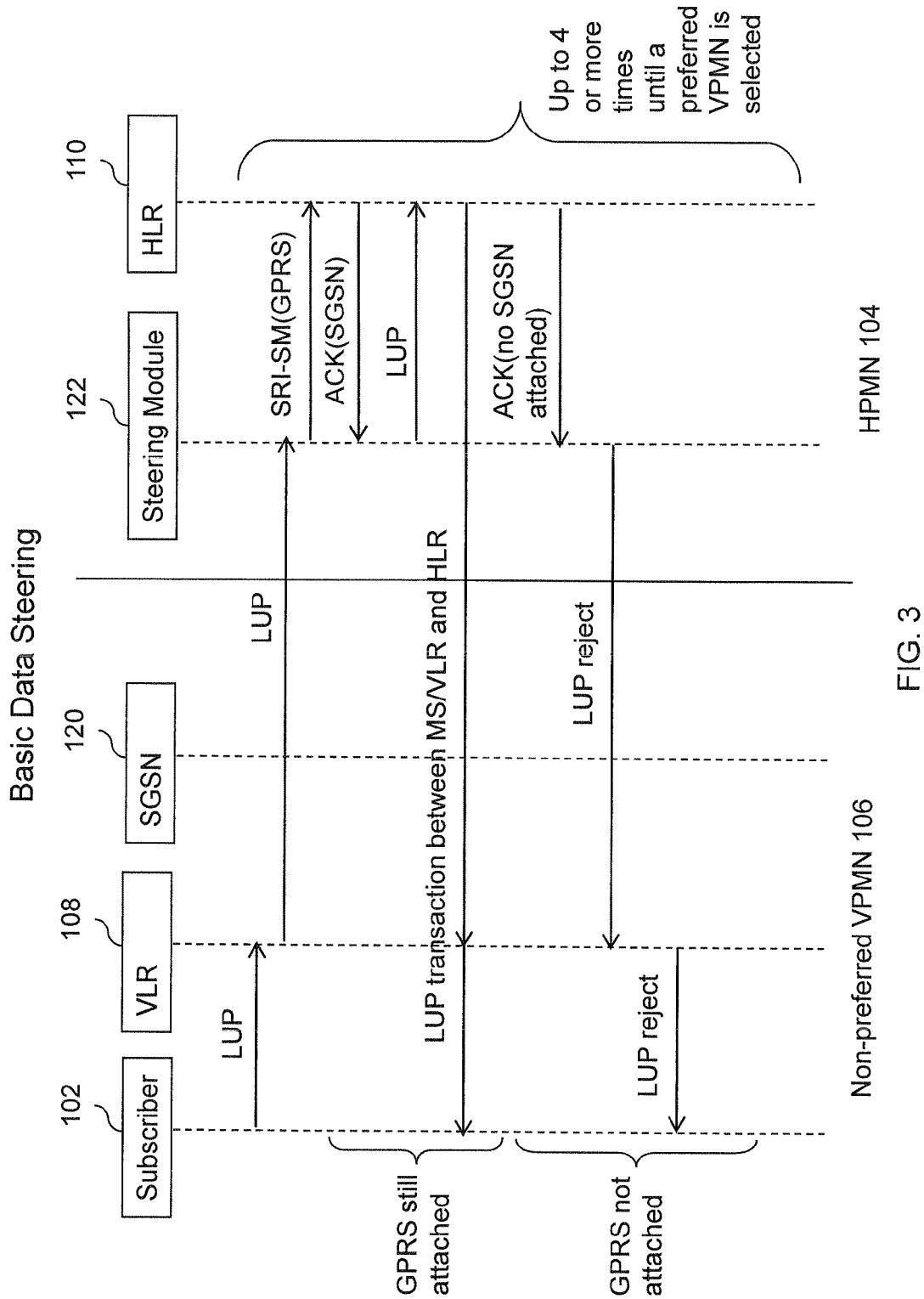
FIG. 3 represents a flow diagram for performing basic data steering of the subscriber from a non-preferred VPMN to a preferred VPMN, in accordance with an embodiment of the present invention.

FIG. 3 represents a flow diagram for performing basic data steering of subscriber 102 from a non-preferred VPMN 106 to a preferred VPMN, in accordance with an embodiment of the present invention. In this embodiment, first steering module 122 detects a GSM LUP from non-preferred VPMN 106. Now, since subscriber 102 also had the GPRS subscription, steering module 122 checks the current status of GPRS session, by sending a SRI-SM (GPRS) message to HLR 110. If the acknowledgment message returns GPRS (i.e., GPRS session is still active), then steering module 122 allows the GSM LUP attempt to pass through to HLR 110. Further, the remaining LUP process is completed with LUP transaction between the HLR 110 and VLR 108 and subscriber 102's mobile handset.

However, if the SRI-ACK message does not return the GPRS session being active, then steering module 122 tries to steer subscriber 102 away from non-preferred VPMN 106. For doing so, steering module 122 sends a LUP reject message to VLR 108 in response to the original LUP message that was sent from VLR 108 towards HLR 110. This process of rejecting LUP attempts from VLR 108 is repeated 4 or more times, so as to compel subscriber 102's handset to look for alternative network in VPMN that may be a preferred VPMN network.

Figure 4:
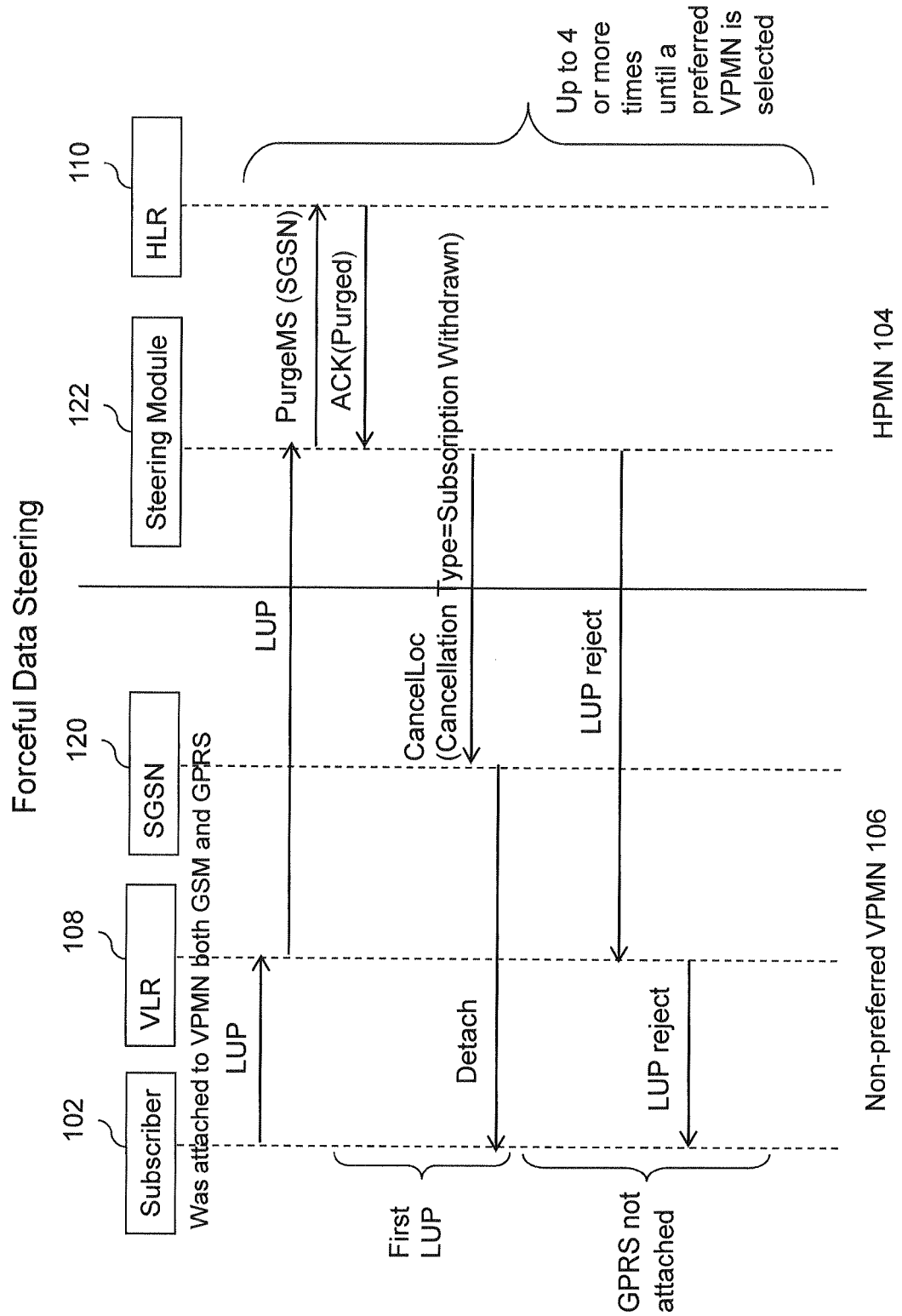
FIG. 4 represents a flow diagram for performing forceful data steering of the subscriber from the non-preferred VPMN to the preferred VPMN, in accordance with an embodiment of the present invention.

FIG. 4 represents a flow diagram for performing forceful data steering of subscriber 102 from non-preferred VPMN 106 to the preferred VPMN, in accordance with an embodiment of the present invention. In this case, subscriber 102 is associated with non-preferred VPMN 106 both via GSM and GPRS connection. Thus, when the location update (LUP) message from subscriber 102 is intercepted at steering module 122, the module sends a PurgeMS (SGSN) message to HLR 110. This message indicates that subscriber 102 is requesting its HPMN to terminate its GPRS session, which actually is done by steering module 122 on behalf of subscriber 102. Thereafter, steering module 122 sends a CancelLocation message with Subscription Withdrawn as the attribute, to SGSN 120 (to notify termination at SGSN end too). Subsequently, SGSN 120 detaches the subscriber 102's handset from the GPRS data connection. Thereafter, steering module 122 performs regular traffic redirection mechanism, where it sends LUP reject messages, 4 or more times, to VLR 108 of non-preferred VPMN 106, so that after a pre-defined number of attempts, the mobile handset of subscriber 102 registers with a preferred VPMN.

Figure 5:
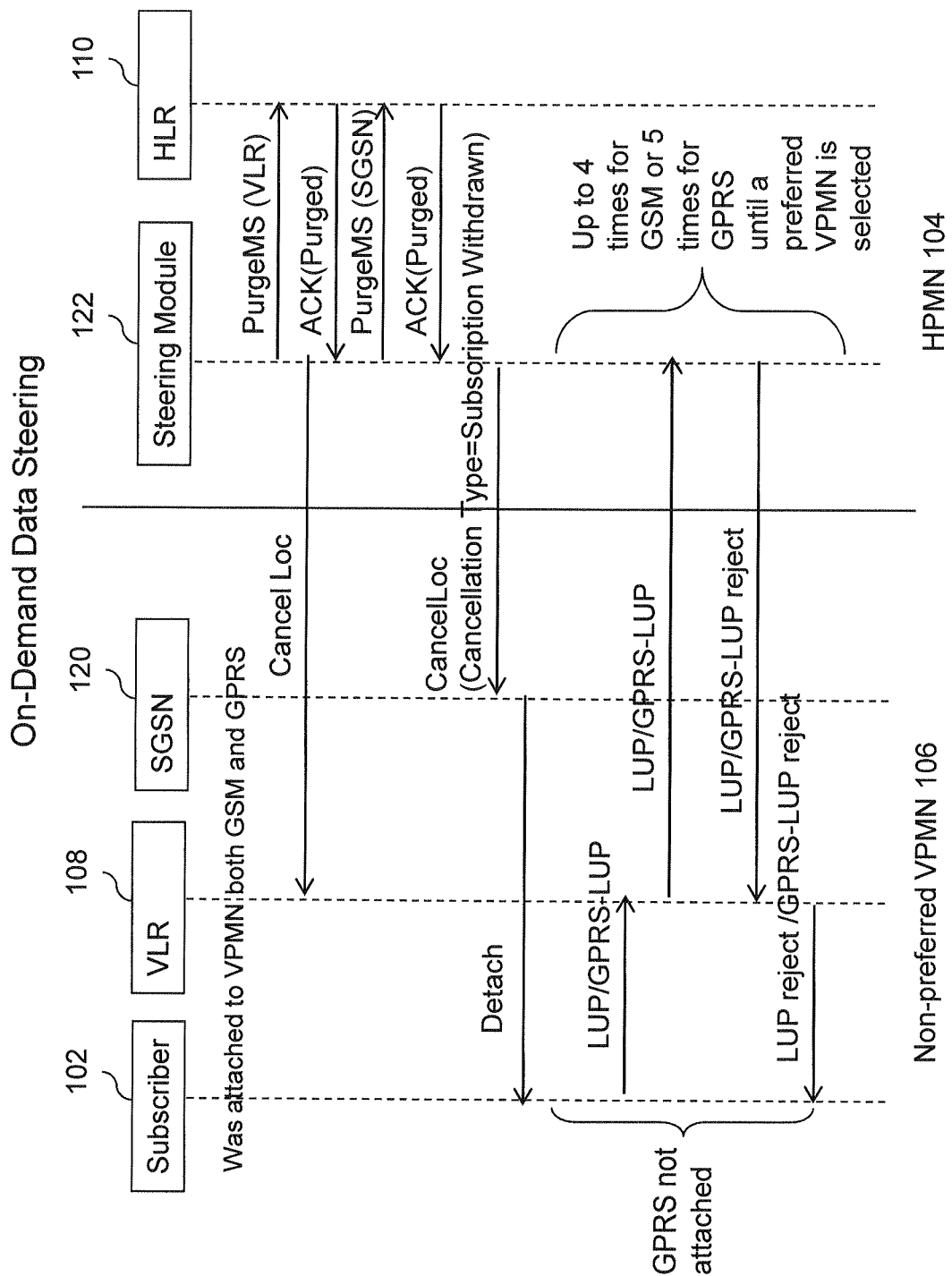
FIG. 5 represents a flow diagram for performing on-demand data steering of the subscriber from the non-preferred VPMN to the preferred VPMN, in accordance with an embodiment of the present invention.

FIG. 5 represents a flow diagram for performing an on-demand data steering of subscriber 102 from non-preferred VPMN 106 to the preferred VPMN, in accordance with an embodiment of the present invention. In this case too, subscriber 102 is associated with non-preferred VPMN 106 both via GSM and GPRS connection. Thus, steering module 122 sends a PurgeMS (VLR) message to HLR 110. This message is to remove VLR 108's entry from its HPMN records at HLR 110. Thereafter, steering module 122 sends a CancelLocation message to VLR 108 to terminate the GSM connection. Subsequently, steering module 122 sends a PurgeMS (SGSN) message to HLR 110 (to notify termination of GPRS session). Steering module 122 then sends a CancelLocation message with Subscription Withdrawn message to SGSN 120. This disconnects the GRPS data session of subscriber 102 from non-preferred VPMN 106. In accordance with an embodiment of the invention, system 100 may also include an IP probe on Gp interface to check if subscriber 102 is still receiving or sending data even after GSM termination. Hence, in one embodiment of the invention, steering module 122 sends the CancelLocation message to SGSN 120 after a pre-defined threshold time interval, if no data exchange is detected by the IP probe. Now, steering module 122 rejects any GSM LUP or GPRS LUP from subscriber 102 until he connects with a preferred VPMN.

Figure 6:
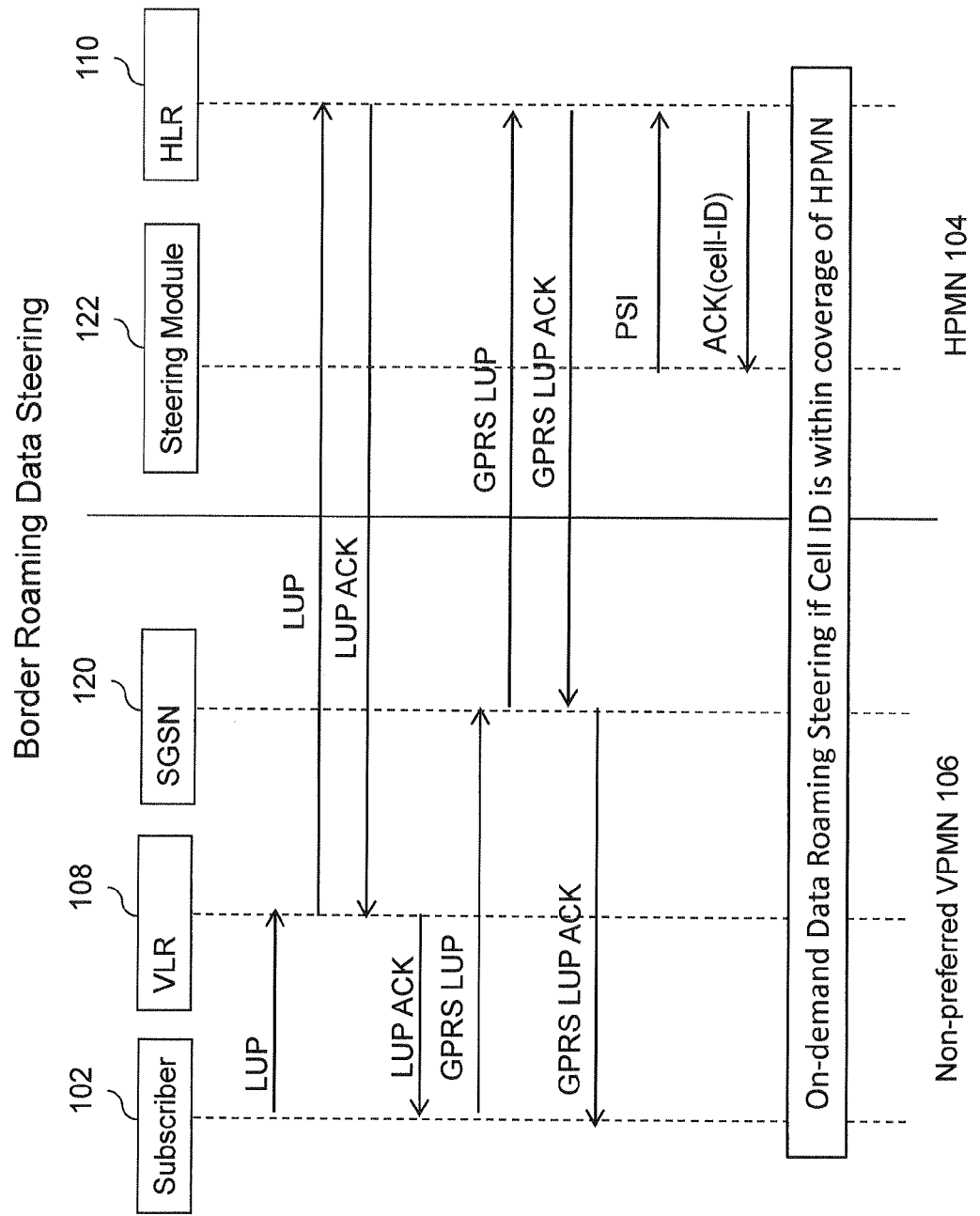
FIG. 6 represents a flow diagram for performing data steering of the subscriber from the non-preferred VPMN to the preferred VPMN, in case the subscriber is roaming on HPMN border, in accordance with an embodiment of the present invention.

FIG. 6 represents a flow diagram for performing boarder roaming data steering of subscriber 102 from non-preferred VPMN 106 to the preferred VPMN, in accordance with an embodiment of the present invention. When subscriber 102 is both GSM and GPRS attached to non-preferred VPMN 106, steering module 122 sends a PSI message to get the subscriber 102's information and the cell ID. If the cell ID is within the coverage of HPMN 104, steering module 122 sends a CancelLocation message with subscription withdrawn message to SGSN 120, and PurgeMS (SGSN) to HLR 110, to terminate the GPRS session completely. Once the GPRS session is disconnected, the regular procedure for conducting on-demand data steering, as explained in conjunction with FIG. 5 above, is executed. In this way, if subscriber 102 is connected to any non-preferred VPMN that lies just within the boundary, i.e., the coverage range of HPMN 104, then steering module 122 still attempts to win back/steer subscriber 102 to a preferred VPMN.

It will be apparent to a person skilled in the art, that the present invention can also be applied to Code Division Multiple Access (CDMA)/American National Standards Institute # 41D (ANSI-41D), and various other technologies such as, but not limited to, VoIP, WiFi, 3GSM and inter-standard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, system 100 will have a separate SS7 and network interfaces, corresponding to both the HPMN and VPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in the table below as a reference.

| GSM MAP | ANSI-41D |
| --- | --- |
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CDROM), compact disk—read/write (CD-R/W) and Digital Versatile Disk (DVD).

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for proactive roaming tests, discoveries of roaming partner services and discoveries of frauds in roaming using simulated roaming traffic. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
|---|---|
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |
| CLI | Calling Line Identification |
| CSD | Circuit Switched Data |
| CSI | Camel Subscription Information |
| DPC | Destination Point Code |
| DSD | Delete Subscriber Data |
| DTMF | Dual Tone Multi-Frequency |
| ERB | CAP Event Report Basic call state model |
| EU | European Union |
| FPMN | Friendly Public Mobile Network |
| FTN | Forward-To-Number |
| GLR | Gateway Location Register |
| GGSN | Gateway GPRS Support Node |
| GMSC | Gateway MSC |
| GMSC-F | GMSC in FPMN |
| GMSC-H | GMSC in HPMN |
| GPRS | General Packet Radio System |
| GSM | Global System for Mobile |
| GSMA | GSM Association |
| GSM SSF | GSM Service Switching Function |
| GsmSCF | GSM Service Control Function |
| GT | Global Title |
| GTP | GPRS Tunnel Protocol |
| HLR | Home Location Register |
| HPMN | Home Public Mobile Network |
| IN | Intelligent Network |
| IOT | Inter-Operator Tariff |
| GTT | Global Title Translation |
| IAM | Initial Address Message |
| IDP | Initial DP IN/CAP message |
| IDD | International Direct Dial |

APPENDIX-continued

| Acronym | Description |
|---|---|
| IMSI | International Mobile Subscriber Identity |
| IMSI-H | HPMN IMSI |
| IN | Intelligent Network |
| INAP | Intelligent Network Application Part |
| INE | Interrogating Network Entity |
| IP | Internet Protocol |
| IREG | International Roaming Expert Group |
| IRS | International Revenue Share |
| ISC | International Service Carrier |
| ISD | MAP Insert Subscriber Data |
| ISG | International Signal Gateway |
| IST | Immediate Service Termination |
| ISTP | International STP |
| ISTP-F | ISTP connected to FPMN STP |
| ISTP-H | ISTP connected to HPMN STP |
| ISUP | ISDN User Part |
| ITPT | Inbound Test Profile Initiation |
| ITR | Inbound Traffic Redirection |
| IVR | Interactive Voice Response |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN MMSC |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International Subscriber Directory Number |
| MSISDN-F | FPMN MSISDN |
| MSISDN-H | HPMN MSISDN |
| MSRN | Mobile Station Roaming Number |
| MSRN-F | FPMN MSRN |
| MSRN-H | HPMN MSRN |
| MT | Mobile Terminated |
| MTP | Message Transfer Part |
| NDC | National Dialing Code |
| NP | Numbering Plan |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |
| OTPI | Outbound Test Profile Initiation |
| PDP | Protocol Data Packet |
| PDN | Packet Data Network |
| PDU | Packet Data Unit |
| PRN | MAP Provide Roaming Number |
| PSI | MAP Provide Subscriber Information |
| QoS | Quality of Service |
| RAEX | Roaming Agreement EXchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |
| RTP | Real-Time Transport Protocol |
| SAI | Send Authentication Info |
| SC | Short Code |
| SCA | Smart Call Assistant |
| SCCP | Signal Connection Control part |
| SCP | Signaling Control Point |

APPENDIX-continued

| Acronym | Description |
|---|---|
| SF | System Failure |
| SG | Signaling Gateway |
| SGSN | Serving GPRS Support Node |
| SGSN-F | FPMN SGSN |
| SIM | Subscriber Identity Module |
| SIGTRAN | Signaling Transport Protocol |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-H | HPMN SMSC |
| SoR | Steering of Roaming |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN STP |
| TADIG | Transferred Account Data Interchange Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TT | Translation Type |
| UD | User Data |
| UDH | User Data Header |
| UDHI | User Data Header Indicator |
| USSD | Unstructured Supplementary Service Data |
| VAS | Value Added Service |
| VIP | Very Important Person |
| VLR | Visited Location Register |
| VLR-F | FPMN VLR |
| VLR-H | HPMN VLR |
| VLR-V | VPMN VLR |
| VMSC | Visited Mobile Switching Center |
| VoIP | Voice over IP |
| VPMN | Visited Public Mobile Network |
| ATI | Access Transport Information |
| UDV | Unexpected Data Value |
| USI | User Service Information |
| WAP | Wireless Access Protocol |

Technical References, the Entirety of Each of Which is Incorporated by Reference Herein:

John Jiang [PI 2007] A single operator and network side solution for inbound and outbound roaming tests and discoveries of roaming partner services and frauds without involving remote probes or real roamer traffic—Phase 1

John Jiang and David Gillot [PI 2008] A single operator and network side solution for inbound and outbound roaming tests and discoveries of roaming partner services and frauds without involving remote probes or real roamer traffic GSM 378 on CAMEL Digital Cellular telecommunications system (Phase 2+); Customized Applications for Mobile network Enhanced Logic (CAMEL) Phase 2; Stage 2 (GSM 03.78 version 6.7.0 Release 1997)

GSM 978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998)

GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998)

GSM 318 on CAMEL Basic Call Handling; Digital cellular telecommunications system (Phase 2+) Basic call handling; Technical realization (GSM 03.18 version 6.6.0 Release 1997)

IREG 32

IREG 24

ITU-T Recommendation Q.1214 (1995), Distributed functional plane for intelligent network CS-1;

ITU-T Recommendation Q.1218 (1995), Interface Recommendation for intelligent network CS-1;

ITU-T Recommendation Q.762 (1999), Signaling system No. 7—ISDN user part general functions of messages and signals;

ITU-T Recommendation Q.763 (1999), Signaling system No. 7—ISDN user part formats and codes;

ITU-T Recommendation Q.764 (1999), Signaling system No. 7—ISDN user part signaling procedures;

ITU-T Recommendation Q.766 (1993), Performance objectives in the integrated services digital network application;

ITU-T Recommendation Q.765 (1998), Signaling system No. 7—Application transport mechanism;

ITU-T Recommendation Q.769.1 (1999), Signaling system No. 7—ISDN user part enhancements for the support of Number Portability;

BA 19 GSMA RAEX on AA 14 and IR 21; and

FF 17 International Revenue Share Fraud.

I claim:

1. A method for directing roaming traffic associated with a subscriber of a Home Public Mobile Network (HPMN), the method comprising:

detecting a location update message from the subscriber at a non-preferred Visited Public Mobile Network (VPMN), wherein the subscriber has an established data context with the non-preferred VPMN;

sending one or more location update messages from the HPMN to one or more elements associated with the non-preferred VPMN, thus causing the subscriber to associate with a preferred VPMN; and checking, via an Internet Protocol (IP) probe, if data exchange is observed between the subscriber handset and a Serving GPRS Support Node (SGSN) of the non-preferred VPMN, wherein a General Packet Radio System (GPRS) cancel location message is sent after a predefined threshold interval, once no data exchange is observed in the data context.

2. The method of claim 1, wherein detecting the location update message further comprises: detecting a Global System for Mobile (GSM) location update message from the subscriber at the non-preferred VPMN.

3. The method of claim 1, wherein detecting the location update message further comprises: detecting a GPRS location update message from the subscriber at the non-preferred VPMN.

4. The method of claim 1, wherein sending one or more location update messages comprises:

sending the GPRS cancel location message with a subscription withdrawn attribute, to the SGSN of the non-preferred VPMN to end the established data context with the non-preferred VPMN; and sending one or more GSM location update reject messages to a Visited Location Register (VLR) of the non-preferred VPMN, to cause the subscriber to register with the preferred VPMN.

5. The method of claim 4 further comprising:
sending a PurgeMS (SGSN) message to a Home Location Register (HLR) of the HPMN after sending the GPRS cancel location message to the SGSN of the non-preferred VPMN.

6. The method of claim 1 further comprising:
checking whether the established data context is active before sending the one or more location update messages to the non-preferred VPMN.

7. A system for directing roaming traffic associated with a subscriber of a Home Public Mobile Network (HPMN), the system comprising:
a detection module that detects a location update message from the subscriber at a non-preferred Visited Public Mobile Network (VPMN), wherein the subscriber has an established data context with the non-preferred VPMN;
a redirection module that sends one or more location update messages from the HPMN towards one or more elements associated with the non-preferred VPMN, thus causing the subscriber to associate with a preferred VPMN; and
an Internet Protocol (IP) probe to check if data exchange is observed between the subscriber handset and a Serving GPRS Support Node (SGSN) of the non-preferred VPMN,
wherein the redirection module sends a General Packet Radio System (GPRS) cancel location message after a predefined threshold interval, once no data exchange is observed in the data context.

8. The system of claim 7, wherein the detection module detects a Global System for Mobile (GSM) location update message from the subscriber at the non-preferred VPMN.

9. The system of claim 7, wherein the detection module detects GPRS location update message from the subscriber at the non-preferred VPMN.

10. The system of claim 7, wherein the redirection module further:
sends the GPRS cancel location message with subscription withdrawn attribute, to the SGSN of the non-preferred VPMN to end the established data context with the non-preferred VPMN; and sends one or more GSM location update reject messages to a Visited Location Register (VLR) of the non-preferred VPMN, to cause the subscriber to register with the preferred VPMN.

11. The system of claim 10, wherein the redirection module further sends a PurgeMS (SGSN) message to HLR of the HPMN after sending the GPRS cancel location message to the SGSN of the non-preferred VPMN.

12. The system of claim 7, wherein the redirection module checks if the established data context is active before sending the one or more location update messages to the non-preferred VPMN.

13. A non-transitory computer readable medium comprising a computer program product having control logic stored therein for causing a computer to direct roaming traffic associated with a subscriber of a Home Public Mobile Network (HPMN), the computer readable medium comprising:
computer readable program code for detecting a location update message from the subscriber at a non-preferred Visited Public Mobile Network (VPMN), wherein the subscriber has an established data context with the non-preferred VPMN;
computer readable program code for sending one or more location update messages from the HPMN to one or more elements associated with the non-preferred VPMN, thus causing the subscriber to associate with a preferred VPMN; and
computer readable program code for checking, via an Internet Protocol (IP) probe, if data exchange is observed between the subscriber handset and a Serving GPRS Support Node (SGSN) of the non-preferred VPMN,
wherein a General Packet Radio System (GPRS) cancel location message is sent after a predefined threshold interval, once no data exchange is observed in the data context.

14. The computer readable medium of claim 13, the control logic further comprising:
computer readable program code for detecting a Global System for Mobile (GSM) location update message from the subscriber at the non-preferred VPMN.

15. The computer readable medium of claim 13, the control logic further comprising:
computer readable program code for detecting a GPRS location update message from the subscriber at the non-preferred VPMN.

16. The computer readable medium of claim 13, the control logic further comprising:
computer readable program code for sending the GPRS cancel location message with a subscription withdrawn attribute, to the SGSN of the non-preferred VPMN to end the established data context with the non-preferred VPMN; and
computer readable program code for sending one or more GSM location update reject messages to a Visited Location Register (VLR) of the non-preferred VPMN, to cause the subscriber to register with the preferred VPMN.

17. The computer readable medium of claim 13, the control logic further comprising:
computer readable program code for checking whether the established data context is active before sending the one or more location update messages to the non-preferred VPMN.

* * * * *